Patented June 14, 1938

2,120,267

UNITED STATES PATENT OFFICE 2,120,267

METHOD OF ENHANCING THE COLORABILITY OF CELLULOSIC FIBER

Erik Schirm, Dessau, Germany, assignor to I. G. Farbenindustrie Aktiengesellschaft, Frankfort-on-the-Main, Germany No Drawing. Application September 18, 1933, Serial No. 690,034. In Germany September 28, 1932

6 Claims. (Cl. 8—20)

The British patent Nos. 249,842 and 263,169 disclose processes which make it possible to impart basic properties to the cellulose fiber (the so-called "amine yarn") by converting the cellulose-sulphonic acid esters (the so-called "immune yarn") obtained from alkali cellulose and organic sulphochlorides, with ammonia or with organic bases. Compared with the methods of these patents the further British patent No. 284,358 discloses a simplification in so far as "amine yarn" is immediately attained by the reaction of organic sulphochlorides on cellulose in the presence of tertiary amines.

The chemical process in the aforesaid methods undoubtedly consists of the conversion of sulphonic acid esters of the cellulose with ammonia, primary and secondary amines according to the following equation:

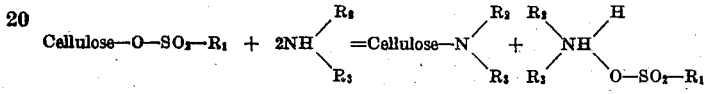

wherein $R_1$ means a hydrocarbon residue (e. g. p-tolyl-), $R_2$ and $R_3$ hydrogen or a hydrocarbon residue. On the other hand the tertiary amines add the cellulose-sulphonic acid esters in forming quaternary ammonia compounds:

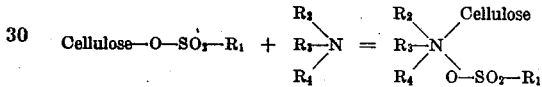

The preceding formulations are justified by the well-known fact that aryl sulphonic acid esters of monovalent, low aliphatic alcohols react with amines in an analogous manner.

Now it has been found, that it is possible to impart those same properties to natural or regenerated cellulose in a different and more advantageous manner by exposing the cellulose to the simultaneous action of aldehydes or ketones or of their derivatives and salts of pyridine bases with strong acids. The derivatives of aldehydes or ketones suitable for the performance of this method must be capable of forming free aldehydes or ketones in an acid medium. By bases of the pyridine type not only the common pyridine and its homologues are to be understood, but also condensed pyridines, such as chinoline or isochinoline. By "strong acids" the mineral acids are meant in general, yet one may likewise employ organic sulphonic acids or ester acids derivable from poly-basic mineral acids. If in this case one chooses sulphonic or ester acids, the hydrocarbon radical of which corresponds to soap-forming carboxylic acids, such as cetyl-sulphonic acid, octadecyl sulphuric acid, sulphoricinol- or sulpho oleic acid, one obtains simultaneously with the forming of the "amine yarn" also a softening effect (cf. Example 8).

In employing such aldehyde- or ketone derivatives which may be considered as esters of strong acids, such as chlor methyl acetate, ethylidene-bromide, benzel chloride or α-halogen ether of the general formula

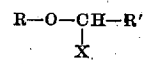

(X=halogen, R and R'=alkyl, cycloalkyl, aralkyl or aryl, R' also hydrogen) such as butylchlor-methyl ether, the mere presence of the free pyridine base will suffice, the latter being obviously transformed by itself in the reaction mixture into the corresponding salt, i. e. into the chlor- or bromhydrate respectively.

The conversion is advantageously done in the presence of inert diluting agents. For this purpose the pyridine bases which are destined for the conversion may be employed, in a free form, as well as the hydrocarbons, chlorinated hydrocarbons, nitrobenzol and similar materials which are much in use as diluting agents. The presence of certain amounts of the free base in admixture with its salt has proved advantageous with regard to the preservation of the fiber.

The temperatures at which the reactions are conducted vary according to the reaction capacity of the aldehyde or ketone or derivative employed. Formaldehyde and its derivatives react the most easily, generally at temperatures of less than 100° C., whereas the other aldehydes and the ketones as well as their derivatives require somewhat higher temperatures.

On employing monomerous, low aliphatic aldehydes and ketones the process is preferably conducted in closed vessels and under pressure. The same procedure should be followed when working with easily volatile pyridine bases, e. g. pyridine itself and/or diluting agents boiling at low temperatures such as chloroform or trichlorethylene, if the reaction does not occur at all or rapidly enough at their boiling points.

The chemical process of the present procedure may be explained as follows: By jointly adding one molecule each of a pyridine salt, e. g. chlorhydrate, and of either an aldehyde or a ketone, the resulting salt is of an α-hydroxylic quaternary ammonia base which will then condense in an etherlike form with the cellulose:

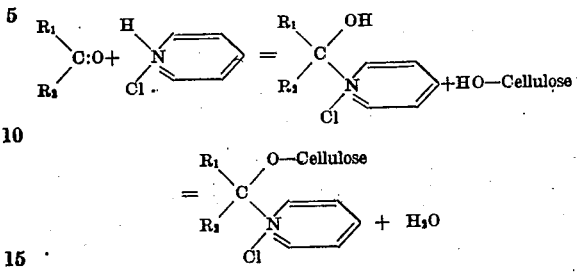

R₁ and R₂ mean either hydrogen or hydrocarbon residue.

The technical progress of the present invention, compared with what was hitherto known, is to be seen, on the one hand, in the fact that instead of the organic sulphochlorides of which only the p-toluol sulpho chloride, as a waste product of the saccharine manufacturing, is available in limited quantities, one is permitted to use the aldehydes and ketones which are much more readily obtainable in any quantity. On the other hand the new procedure offers the advantage that the materials used enter entirely into and become part of the final product of the reaction, whereas the organic sulpho chlorides prescribed by the former procedures serve as mere auxiliary agents which in the form of salts of their sulphonic acids become waste products during the process.

Some illustrative examples for the treatment of cellulose are given below, followed by a description of the improvement in the dyeing properties of the treated cellulose.

*Example 1*

1 part by weight of paraformaldehyde (trioxymethylene), 4 of pyridine chlorhydrate and 2 of cotton are brought into 100 parts by weight of chloroform. The mixture is then boiled under reflux for 6 to 8 hours. The cotton is now centrifuged or pressed and after washing with alcohol and water it is ready for the dyeing.

*Example 2*

3 parts by weight of a 40% formaldehyde solution are mixed with 90 parts of pyridine; 4 parts of pyridine chlorhydrate are then added and 2 parts of cotton or viscose artificial silk are introduced. Then the mixture is heated for 3 to 4 hours to 90–100° C. with frequent agitation of the cotton. This operation is preferably carried out in a closed vessel. The cotton is pressed or centrifuged as per Example 1 and after washing with water it is ready for the direct dyeing. An intermediate drying is also admissible without ado.

*Example 3*

1 part by weight of ethylidenediacetate is mixed with 30 parts of a mixture of pyridine bases such as are used for making denatured alcohol, whereupon 1 part of pyridine chlorhydrate is added. Two parts of cotton are then added and the whole is heated for 4 hours to 120° C., whereupon the cotton is separated from the reaction mixture and washed and dried as mentioned above.

The ethylidenediacetate may be replaced by paraldehyde or acetal. It is also possible to use monomerous acetaldehyde; in this case the mixture is heated in a closed vessel.

*Example 4*

1 part by weight of benzalchloride, 1 part of cotton and 20 parts of pyridine are boiled for 7 hours under reflux-condensation. The separation and after-treatment of the cotton are the same as described above.

*Example 5*

1 part by weight of furfurol, 1 of pyridinesulphate, 1 of cotton and 20 of pyridine are heated under reflux for 5 hours up to the boiling point. Then one proceeds as described above.

*Example 6*

1 part by weight of isopropylacetone is mixed with 20 parts of pyridine; then one adds 1 part of concentrated hydrochloric acid and furthermore 1 part of cotton. The mixture is boiled under reflux for 4 hours, whereupon the cotton is separated, washed and dried as above. If one wishes to replace the isopropylacetone by acetone, it is preferable to carry out the process in a closed vessel.

*Example 7*

1 part by weight of butylchlormethylether is stirred into 10 parts of pyridine free of water and as soon as the development of heat ceases, one adds 1 part of cotton, which is kept in the bath for 4 hours under a thorough working at a water-bath-temperature. Then one squeezes off or centrifuges and washes the cotton with pyridine or alcohol; the washing agent is then removed and the thus treated cotton is dyed.

Instead of the butylchlormethylether one may likewise employ with the same good result the chlormethyl- or α-chlorethylethers respectively of other alcohols such as methyl-, ethyl-, propyl-, amyl-, cyclohexyl- or benzyl alcohol.

*Example 8*

30 parts by weight of cetyl sulphonic acid are dissolved in 300 parts of pyridine, then 3 parts of formaldehyde in gas form are introduced into the solution whereupon one adds 30 parts of cotton or viscose artificial silk. Now one heats the reaction mass for 5 hours in a closed vessel up to 90–100° C., then one cools it down; the yarn is centrifuged, then washed with a small amount of pyridine, whereupon the adhering solvent is evaporated or washed out with water and finally it is dried. The fiber thus obtained feels soft and wool-like. The treatment-liquid may be reemployed for further operations by replenishing the consumed amounts of cetyl sulphonic acid and formaldehyde.

As to the colorability the cellulose fiber preliminarily treated according to the present invention is like the so-called "amine yarn", i. e. it is dyed directly by all dyestuffs and dyestuff intermediates of an acid character, therefore by the direct cotton dyestuffs, the so-called "acid" wool dyestuffs, further by mordant dyestuffs, such as alizarine, logwood- or yellowwood extract and others, by sulphuric acid ester salts of vatting-dyestuffs ("indigosoles"), by the 2,3-oxynaphthoic acid-arylides etc.

The present invention therefore facilitates the manufacture of equal dyeings on mixed fabrics made of cellulose fiber and animal fiber, since it places at one's disposal a richer selection of dyestuffs which possess about the same drawing power for the animal fiber as well as for the cellulose fiber preliminarily treated according to the invention.

Substantive dyestuffs draw on the new yarn more energetically by far than on ordinary cellulose fiber and these dyeings are in many cases considerably faster to washing than on ordinary cellulose fiber; this may be explained by the fact, that the dyestuff owing to its special constitution is not only adsorbed by the cellulose (as is also the case with ordinary substantive dyeings), but simultaneously also it is chemically bound to the substrate by its sulpho groups as a quaternary ammonium salt.

If a preliminarily treated and wetted material is brought into a cold bath which contains in the usual bath length (1:10 to 1:20) or in a larger one the usual percentages of its weight of any substantive dyestuff (e. g. Congo-red, diamine-brown M, diamine-blue BB; Schultz-Julius, Farbstofftabellen 1914, Nr. 307, 344, 337, and others), the dyestuff draws in a short time completely on the fiber, even in the absence of the otherwise usual admixtures, such as common salt, sodium sulphate, soda etc. These dyeings are much faster against washing than those on ordinary cellulose. Also non-substantive acid dyestuffs such as orange II, fast-red A, alizarine saphirol B (Schultz-Julius, loc. cit. Nr. 145, 161, 858) show a similar drawing capacity even in the cold, whereas other ones such as naphthylamine black D (Schultz-Julius, loc. cit. Nr. 266) draw on better when warm, at about 60° C. One can also observe, that dyestuffs capable of drawing on completely or nearly completely when cold, partially bleed out during the heating of the bath, whereas on cooling down the bath they again draw on entirely. With regard to the uniform dyeing it is, however, recommended to perform the dyeings as usual in a heated bath.

The usual methods of enhancing the fastness to washing of dyeings on cellulose fiber consists in diazotizing the dyestuff on the fiber and in developing with azo-components, as well as the after-treatment of suitable dyestuffs on the fiber with diazonium compounds, may likewise be adopted for the cellulose fiber preliminarily treated according to the invention, but the circle of the dyestuffs considered for the purpose is then considerably enlarged. Thus, for example, it is possible to diazotize on the fiber a dyeing of naphthylamine-black D (see above) used hitherto only as wool dyestuff, and to develop with an alkaline solution of β-naphthol to a neutral dark black. In an analogous manner the dyestuff naphthylamine-brown S (Schultz-Julius, loc. cit Nr. 160) can be dyed on and developed with diazotized p-nitraniline to a washing-fast brown.

Also the chrome development-dyestuffs for wool, such as eriochrome-red B (Schultz-Julius, loc. cit. Nr. 29) can be dyed upon the new yarn and developed with chromates in the well known manner during or after the dyeing and preferably in a slightly acid solution.

Particularly remarkable is the further fact that not only dyestuffs and their intermediates but also other compounds with acid properties such as tannic acids, fatty acids, resin- and naphthene acids, sulphonated fats and oils, as well as ester salts of polyvalent mineral acids with higher fatty or naphthene alcohols and furthermore the fatty acid-compounds of the isoethionic acid or of the taurin or of similar compounds, are bound by the fiber preliminarily treated according to the present invention. Moreover it is remarkable that those of the aforementioned classes of materials which possess the properties of soaps or soap-formers, produce quite excellent softening and smoothing effects. A particular advantage of this smoothing and softening, compared with that on ordinary cellulose consists, on the one hand, in that it is perfectly fast to the washing, since the soaps or soap like products employed for the washing operation exert a smoothing and softening action upon the new yarn; on the other hand one can simultaneously dye and smooth or soften the yarn by adding the dyestuff and smoothing or softening agent to the treatment bath in the desired proportions and then proceeding in the usual way.

What I claim is:

1. Procedure for enhancing the colorability of natural and regenerated cellulose, which comprises treating the fiber with salts of bases of the pyridine type with strong acids in the presence of inert diluting agents, and simultaneously with compounds of the general formula $$R-CO-R'$$

wherein R and R' mean hydrogen or any hydrocarbon radical, the said treatment involving heating at an elevated temperature at which the salts and compounds react, and unite with the cellulose.

2. Procedure for enhancing the colorability of natural and regenerated cellulose, which comprises treating the fiber with salts of bases of the pyridine type with strong acids in the presence of inert diluting agents and simultaneously with aldehydes, the said treatment involving heating at a temperature which causes reaction of the substances to occur, thereby causing said cellulose to become more readily receptive to dyes.

3. Procedure for enhancing the colorability of natural and regenerated cellulose, which comprises treating the fiber with salts of bases of the pyridine type with strong acids in the presence of inert diluting agents and simultaneously with aliphatic aldehydes, which treatment involves heating at a temperature which causes reaction of the said ingredients, and the reaction product to become more readily receptive to dyes.

4. The process of enhancing the colorability of natural and regenerated cellulose which comprises treating such fiber with a salt of a base of the pyridine type with a strong acid in the presence of an inert diluting agent of the pyridine type and simultaneously with a compound of the general formula $$R-CO-R'$$

wherein R and R' mean hydrogen or a hydrocarbon radical, said treatment involving heating at an elevated temperature at which the said substances react and cause said cellulose to become more readily receptive to dyes.

5. The cellulosic textile material having enhanced colorability over natural cellulose and regenerated cellulose which embodies the reaction product of the general formula

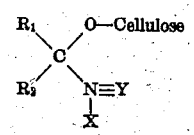

wherein $R_1$ and $R_2$ denote hydrogen or hydrocarbon radicals, X denotes a negative atom or radical of a strong acid and $N\equiv Y$ a radical of a base of the pyridine type.

6. Procedure for enhancing the colorability of natural and regenerated cellulose, which comprises treating the fiber with salts of bases of the pyridine type with strong acids in the presence of inert diluting agents and simultaneously with a member of the group consisting of monomerous and polymerous formaldehyde, the said treatment involving heating at a temperature which causes reaction of the substances to occur thereby causing said cellulose to become more readily receptive to dyes.

ERIK SCHIRM.